UNITED STATES PATENT OFFICE.

ORLANDO V. FOUTZ, OF VACAVILLE, CALIFORNIA.

ADHESIVE COMPOSITION.

1,360,915.  Specification of Letters Patent.  Patented Nov. 30, 1920.

No Drawing.  Application filed September 20, 1919. Serial No. 325,051.

*To all whom it may concern:*

Be it known that I, ORLANDO V. FOUTZ, a citizen of the United States, residing at Vacaville, in the county of Solano and State of California, have invented new and useful Improvements in Adhesive Composition, of which the following is a specification.

The object of my present invention is the provision of an inexpensive and efficient composition for general adhesive purposes, such as connecting together opposed portions of wood, paper and cloth as well as other materials, as hereinafter described and claimed.

The best practical embodiment of my invention of which I am cognizant, is composed of the following ingredients combined in approximately the proportions stated, viz:

| | |
|---|---|
| Ground tapioca | 2 ounces. |
| Sodium chlorid (preferably table salt) | ½ ounce. |
| Liquid or flake glue | 2 ounces. |
| Glucose | ½ ounce. |
| Solvent (preferably pure water or vinegar) | 14 ounces. |

In preparing my novel composition, the ingredients are commingled in a vessel, and the mixture is permitted to stand for approximately twenty-four hours. It is then boiled for fifteen or twenty minutes, and is stirred constantly during the boiling operation. It is then ready to be packaged.

The glue in the proportions stated assures the composition quickly setting, while the tapioca renders the composition exceedingly hard when dry. The glucose serves to render the solution soft and pliable, and the salt has for its function to preserve the composition.

The composition is manifestly inexpensive, and its efficiency in the connection of wooden, paper and cloth articles has been demonstrated, as has also its utility in the connection of automobile tops.

Having described my invention, what I claim and desire to secure by Letters-Patent, is:

1. An adhesive composition comprising tapioca—two ounces; sodium chlorid—one-half ounce; glue—three ounces; glucose one-half ounce, and a solvent fourteen ounces.

2. An adhesive composition comprising a major portion of glue and tapioca, and a minor portion of sodium chlorid and glucose in combination with sufficient solvent to reduce the mass to a paste.

In testimony whereof I affix my signature.

ORLANDO V. FOUTZ.